(12) United States Patent
Ge et al.

(10) Patent No.: US 7,930,277 B2
(45) Date of Patent: Apr. 19, 2011

(54) COST-BASED OPTIMIZER FOR AN XML DATA REPOSITORY WITHIN A DATABASE

(75) Inventors: Fei Ge, Palo Alto, CA (US); Sivasankaran Chandrasekar, Palo Alto, CA (US); Nipun Agarwal, Santa Clara, CA (US); Ravi Murthy, Fremont, CA (US); Eric Sedlar, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 397 days.

(21) Appl. No.: 10/830,211

(22) Filed: Apr. 21, 2004

(65) Prior Publication Data
US 2005/0240624 A1 Oct. 27, 2005

(51) Int. Cl.
*G06F 7/00* (2006.01)
*G06F 17/00* (2006.01)
(52) U.S. Cl. ........ 707/688; 707/696; 707/719; 707/776; 707/778
(58) Field of Classification Search ................. 707/104.1
See application file for complete search history.

(56) References Cited

U.S. PATENT DOCUMENTS

| | | |
|---|---|---|
| 4,993,025 A | 2/1991 | Vesel et al. |
| 5,202,982 A | 4/1993 | Gramlich et al. |
| 5,210,686 A | 5/1993 | Jernigan |
| 5,226,137 A | 7/1993 | Bolan et al. |
| 5,247,658 A | 9/1993 | Barrett et al. |
| 5,257,366 A | 10/1993 | Adair et al. |
| 5,295,256 A | 3/1994 | Bapat |
| 5,295,261 A | 3/1994 | Simonetti |
| 5,307,490 A | 4/1994 | Davidson et al. |
| 5,313,629 A | 5/1994 | Abraham et al. |
| 5,327,556 A | 7/1994 | Mohan et al. |
| 5,369,763 A | 11/1994 | Biles |
| 5,388,257 A | 2/1995 | Bauer |

(Continued)

FOREIGN PATENT DOCUMENTS
EP 856803 A2 8/1998
(Continued)

OTHER PUBLICATIONS

"Building XML statistics for the hidden web", by Ashraf Aboulnaga and Jeffrey F. Naughton, Proceedings of the 28th VLDB Conference,Hong Kong, China, 2002.*

(Continued)

*Primary Examiner* — Jay A Morrison
(74) *Attorney, Agent, or Firm* — Hickman Palermo Truong & Becker LLP

(57) ABSTRACT

Cost-based optimizer functionality for an XML database repository provides means for optimizing the execution of database queries that access XML resources in the database repository. Statistics about XML resources that are stored in the database repository are gathered, stored and utilized by a query optimizer to compute computational costs associated with each of multiple methods of accessing particular XML resources requested in a database query. Hence, the optimizer is able to select the most efficient query execution plan based on the costs of possible access paths. In one embodiment, specific statistics about the hierarchical structure of XML resources stored in the XML database repository are gathered, stored in a relational table in the database management system, and used to compute the selectivity of query predicates and the index cost associated with traversing one or more indexes to access requested XML resources.

43 Claims, 4 Drawing Sheets

U.S. PATENT DOCUMENTS

| | | | |
|---|---|---|---|
| 5,404,513 A | 4/1995 | Powers et al. | |
| 5,410,691 A | 4/1995 | Taylor | |
| 5,454,101 A | 9/1995 | Mackay et al. | |
| 5,463,772 A | 10/1995 | Thompson et al. | |
| 5,467,471 A | 11/1995 | Bader | |
| 5,499,371 A | 3/1996 | Henninger et al. | |
| 5,504,892 A | 4/1996 | Atsatt et al. | |
| 5,506,991 A | 4/1996 | Curry et al. | |
| 5,524,240 A | 6/1996 | Barbara et al. | |
| 5,530,849 A | 6/1996 | Hanushevsky et al. | |
| 5,544,360 A | 8/1996 | Lewak et al. | |
| 5,546,571 A | 8/1996 | Shan et al. | |
| 5,561,763 A | 10/1996 | Eto et al. | |
| 5,566,331 A | 10/1996 | Irwin, Jr. et al. | |
| 5,568,640 A | 10/1996 | Nishiyama et al. | |
| 5,574,915 A | 11/1996 | Lemon et al. | |
| 5,625,815 A | 4/1997 | Maier et al. | |
| 5,630,125 A | 5/1997 | Zellweger | |
| 5,643,633 A | 7/1997 | Telford et al. | |
| 5,680,614 A | 10/1997 | Bakuya et al. | |
| 5,682,524 A | 10/1997 | Freund et al. | |
| 5,684,990 A | 11/1997 | Boothby | |
| 5,689,706 A | 11/1997 | Rao et al. | |
| 5,701,467 A | 12/1997 | Freeston | |
| 5,724,577 A | 3/1998 | Exley et al. | |
| 5,734,887 A | 3/1998 | Kingberg et al. | |
| 5,737,736 A | 4/1998 | Chang | |
| 5,758,153 A | 5/1998 | Atsatt et al. | |
| 5,802,518 A | 9/1998 | Karaev et al. | |
| 5,819,275 A | 10/1998 | Badger et al. | |
| 5,822,511 A | 10/1998 | Kashyap et al. | |
| 5,832,526 A | 11/1998 | Schuyler | |
| 5,838,965 A | 11/1998 | Kavanagh et al. | |
| 5,842,212 A | 11/1998 | Balluvio et al. | |
| 5,848,246 A | 12/1998 | Gish | |
| 5,870,590 A | 2/1999 | Kita et al. | |
| 5,878,415 A | 3/1999 | Olds | |
| 5,878,434 A | 3/1999 | Draper et al. | |
| 5,892,535 A | 4/1999 | Allen et al. | |
| 5,897,632 A | 4/1999 | Dar et al. | |
| 5,905,990 A | 5/1999 | Inglett | |
| 5,915,253 A | 6/1999 | Christiansen | |
| 5,917,492 A | 6/1999 | Bereiter et al. | |
| 5,918,225 A | 6/1999 | White et al. | |
| 5,921,582 A | 7/1999 | Gusack | |
| 5,937,406 A | 8/1999 | Balabine et al. | |
| 5,940,591 A | 8/1999 | Boyle et al. | |
| 5,960,194 A | 9/1999 | Choy et al. | |
| 5,964,407 A | 10/1999 | Sandkleiva | |
| 5,974,407 A | 10/1999 | Sacks | |
| 5,978,791 A | 11/1999 | Farber et al. | |
| 5,983,215 A | 11/1999 | Ross et al. | |
| 5,987,506 A | 11/1999 | Carter et al. | |
| 5,991,771 A | 11/1999 | Falls et al. | |
| 5,999,936 A | 12/1999 | Pattison et al. | |
| 5,999,941 A | 12/1999 | Andersen | |
| 6,003,040 A | 12/1999 | Mital et al. | |
| 6,012,067 A | 1/2000 | Sarkar | |
| 6,018,747 A | 1/2000 | Burns et al. | |
| 6,023,706 A | 2/2000 | Schmuck et al. | |
| 6,023,765 A | 2/2000 | Kuhn | |
| 6,029,160 A | 2/2000 | Cabrera et al. | |
| 6,029,166 A | 2/2000 | Mutalik et al. | |
| 6,029,175 A | 2/2000 | Chow et al. | |
| 6,038,563 A | 3/2000 | Bapat et al. | |
| 6,052,122 A | 4/2000 | Sutcliffe et al. | |
| 6,055,544 A | 4/2000 | DeRose et al. | |
| 6,061,684 A | 5/2000 | Glasser et al. | |
| 6,088,694 A | 7/2000 | Burns et al. | |
| 6,092,086 A | 7/2000 | Martin et al. | |
| 6,101,500 A | 8/2000 | Lau | |
| 6,111,578 A | 8/2000 | Tesler | |
| 6,112,209 A | 8/2000 | Gusack | |
| 6,115,741 A | 9/2000 | Domenikos et al. | |
| 6,119,118 A | 9/2000 | Kain, III et al. | |
| 6,128,610 A | 10/2000 | Srinivasan et al. | |
| 6,141,655 A | 10/2000 | Johnson et al. | |
| 6,154,741 A | 11/2000 | Feldman | |
| 6,182,121 B1 | 1/2001 | Wlaschin | |
| 6,185,574 B1 | 2/2001 | Howard et al. | |
| 6,189,012 B1 | 2/2001 | Mital et al. | |
| 6,192,273 B1 | 2/2001 | Igel et al. | |
| 6,192,373 B1 | 2/2001 | Haegele | |
| 6,199,195 B1 | 3/2001 | Goodwin et al. | |
| 6,208,993 B1 | 3/2001 | Shadmone | |
| 6,212,512 B1 | 4/2001 | Barney et al. | |
| 6,212,557 B1 | 4/2001 | Oran | |
| 6,230,310 B1 | 5/2001 | Arrouye et al. | |
| 6,233,729 B1 | 5/2001 | Campara et al. | |
| 6,236,988 B1 | 5/2001 | Aldred | |
| 6,240,407 B1 | 5/2001 | Chang et al. | |
| 6,247,024 B1 | 6/2001 | Kincaid | |
| 6,263,332 B1 | 7/2001 | Nasr et al. | |
| 6,263,345 B1 * | 7/2001 | Farrar et al. | 707/104.1 |
| 6,269,380 B1 | 7/2001 | Terry et al. | |
| 6,269,431 B1 | 7/2001 | Dunham | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,301,605 B1 | 10/2001 | Napolitano et al. | |
| 6,321,219 B1 | 11/2001 | Gainer et al. | |
| 6,330,573 B1 | 12/2001 | Salisbury et al. | |
| 6,339,382 B1 | 1/2002 | Arbinger et al. | |
| 6,341,289 B1 | 1/2002 | Burroughs et al. | |
| 6,343,287 B1 | 1/2002 | Kumar et al. | |
| 6,349,295 B1 | 2/2002 | Tedesco et al. | |
| 6,356,920 B1 | 3/2002 | Vandersluis | |
| 6,363,371 B1 * | 3/2002 | Chaudhuri et al. | 707/2 |
| 6,366,921 B1 | 4/2002 | Hansen et al. | |
| 6,366,934 B1 | 4/2002 | Cheng et al. | |
| 6,370,537 B1 | 4/2002 | Gilbert et al. | |
| 6,370,548 B1 | 4/2002 | Bauer et al. | |
| 6,389,427 B1 | 5/2002 | Faulkner | |
| 6,389,433 B1 | 5/2002 | Bolosky et al. | |
| 6,393,435 B1 | 5/2002 | Gartner et al. | |
| 6,397,231 B1 | 5/2002 | Salisbury et al. | |
| 6,418,448 B1 | 7/2002 | Sarkar | |
| 6,421,692 B1 | 7/2002 | Milne et al. | |
| 6,427,123 B1 | 7/2002 | Sedlar | |
| 6,438,540 B2 | 8/2002 | Nasr et al. | |
| 6,438,550 B1 | 8/2002 | Doyle et al. | |
| 6,438,562 B1 | 8/2002 | Gupta et al. | |
| 6,442,548 B1 | 8/2002 | Balabine et al. | |
| 6,446,091 B1 | 9/2002 | Noren et al. | |
| 6,449,620 B1 | 9/2002 | Draper et al. | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,519,597 B1 | 2/2003 | Cheng et al. | |
| 6,529,901 B1 * | 3/2003 | Chaudhuri et al. | 707/3 |
| 6,539,398 B1 | 3/2003 | Hannan et al. | |
| 6,542,898 B1 | 4/2003 | Sullivan et al. | |
| 6,571,231 B2 | 5/2003 | Sedlar | |
| 6,574,655 B1 | 6/2003 | Libert et al. | |
| 6,584,459 B1 | 6/2003 | Chang et al. | |
| 6,594,675 B1 | 7/2003 | Schneider | |
| 6,598,055 B1 | 7/2003 | Keesey et al. | |
| 6,604,100 B1 | 8/2003 | Fernandez et al. | |
| 6,609,121 B1 | 8/2003 | Ambrosini et al. | |
| 6,611,843 B1 | 8/2003 | Jacobs | |
| 6,615,203 B1 | 9/2003 | Lin et al. | |
| 6,636,845 B2 | 10/2003 | Chau et al. | |
| 6,643,633 B2 | 11/2003 | Chau et al. | |
| 6,662,342 B1 | 12/2003 | Marcy | |
| 6,675,230 B1 | 1/2004 | Lewallen | |
| 6,681,221 B1 | 1/2004 | Jacobs | |
| 6,684,227 B2 | 1/2004 | Duxbury | |
| 6,697,805 B1 | 2/2004 | Choquier et al. | |
| 6,704,739 B2 | 3/2004 | Craft et al. | |
| 6,704,747 B1 | 3/2004 | Fong | |
| 6,708,186 B1 | 3/2004 | Claborn et al. | |
| 6,718,322 B1 | 4/2004 | Brye | |
| 6,721,723 B1 | 4/2004 | Gibson et al. | |
| 6,725,212 B2 | 4/2004 | Couch et al. | |
| 6,732,222 B1 | 5/2004 | Garritsen et al. | |
| 6,754,661 B1 | 6/2004 | Hallin et al. | |
| 6,772,350 B1 | 8/2004 | Belani et al. | |

| | | |
|---|---|---|
| 6,778,977 B1 | 8/2004 | Avadhanam et al. |
| 6,785,673 B1 | 8/2004 | Fernandez et al. |
| 6,795,821 B2 | 9/2004 | Yu |
| 6,801,224 B1 | 10/2004 | Lewallen |
| 6,826,568 B2 | 11/2004 | Bernstein et al. |
| 6,826,727 B1 | 11/2004 | Mohr et al. |
| 6,836,778 B2 | 12/2004 | Manikutty et al. |
| 6,836,857 B2 | 12/2004 | Ten-Hove et al. |
| 6,871,204 B2 | 3/2005 | Krishnaprasad et al. |
| 6,901,403 B1 * | 5/2005 | Bata et al. .................... 707/101 |
| 6,915,304 B2 | 7/2005 | Krupa |
| 6,920,457 B2 | 7/2005 | Pressmar |
| 6,947,927 B2 * | 9/2005 | Chaudhuri et al. .............. 707/3 |
| 6,964,025 B2 | 11/2005 | Angiulo et al. |
| 7,031,956 B1 | 4/2006 | Lee et al. |
| 7,043,487 B2 * | 5/2006 | Krishnamurthy et al. .... 707/100 |
| 7,043,488 B1 | 5/2006 | Baer et al. |
| 7,113,936 B1 * | 9/2006 | Michel et al. .................... 707/2 |
| 7,120,645 B2 | 10/2006 | Manikutty et al. |
| 7,139,746 B2 | 11/2006 | Shin et al. |
| 7,139,749 B2 * | 11/2006 | Bossman et al. ................. 707/3 |
| 7,162,485 B2 | 1/2007 | Gottlob et al. |
| 7,171,404 B2 | 1/2007 | Lindblad et al. |
| 7,171,407 B2 | 1/2007 | Barton et al. |
| 7,174,328 B2 * | 2/2007 | Stanoi et al. ..................... 707/3 |
| 7,194,462 B2 | 3/2007 | Riccardi et al. |
| 7,216,127 B2 | 5/2007 | Auerbach |
| 7,228,312 B2 * | 6/2007 | Chaudhuri et al. ........... 707/102 |
| 7,315,852 B2 | 1/2008 | Balmin et al. |
| 7,386,568 B2 | 6/2008 | Warner et al. |
| 7,433,885 B2 * | 10/2008 | Jones .............................. 707/102 |
| 2001/0037345 A1 | 11/2001 | Kiernan et al. |
| 2001/0049675 A1 | 12/2001 | Mandler et al. |
| 2002/0015042 A1 | 2/2002 | Robotham et al. |
| 2002/0035606 A1 | 3/2002 | Kenton |
| 2002/0038358 A1 | 3/2002 | Sweatt, III et al. |
| 2002/0056025 A1 | 5/2002 | Qiu et al. |
| 2002/0073019 A1 | 6/2002 | Deaton |
| 2002/0078068 A1 | 6/2002 | Krishnaprasad et al. |
| 2002/0087596 A1 | 7/2002 | Lewontin |
| 2002/0116371 A1 | 8/2002 | Dodds et al. |
| 2002/0116457 A1 | 8/2002 | Eshleman et al. |
| 2002/0120685 A1 | 8/2002 | Srivastava et al. |
| 2002/0123993 A1 | 9/2002 | Chau et al. |
| 2002/0124100 A1 | 9/2002 | Adams |
| 2002/0133484 A1 | 9/2002 | Chau et al. |
| 2002/0143512 A1 | 10/2002 | Shamoto et al. |
| 2002/0152267 A1 | 10/2002 | Lennon |
| 2002/0156772 A1 | 10/2002 | Chau et al. |
| 2002/0156811 A1 | 10/2002 | Krupa |
| 2002/0167788 A1 | 11/2002 | Lee et al. |
| 2002/0184188 A1 | 12/2002 | Mandyam et al. |
| 2002/0184401 A1 | 12/2002 | Kadel, Jr. et al. |
| 2002/0188613 A1 | 12/2002 | Chakraborty et al. |
| 2002/0194157 A1 | 12/2002 | Zait et al. |
| 2002/0198874 A1 | 12/2002 | Nasr et al. |
| 2003/0004937 A1 | 1/2003 | Salmenkaita et al. |
| 2003/0009361 A1 | 1/2003 | Hancock et al. |
| 2003/0014397 A1 | 1/2003 | Chau et al. |
| 2003/0065659 A1 | 4/2003 | Agarwal et al. |
| 2003/0069881 A1 | 4/2003 | Huttunen |
| 2003/0078906 A1 | 4/2003 | Ten-Hove et al. |
| 2003/0084056 A1 | 5/2003 | DeAnna et al. |
| 2003/0093672 A1 | 5/2003 | Cichowlas |
| 2003/0101194 A1 | 5/2003 | Rys et al. |
| 2003/0105732 A1 | 6/2003 | Kagalwala et al. |
| 2003/0131051 A1 | 7/2003 | Lection et al. |
| 2003/0140308 A1 | 7/2003 | Murthy et al. |
| 2003/0158897 A1 | 8/2003 | Ben-Natan |
| 2003/0163519 A1 * | 8/2003 | Kegel et al. .................... 709/203 |
| 2003/0167277 A1 | 9/2003 | Hejlsberg et al. |
| 2003/0172135 A1 | 9/2003 | Bobick et al. |
| 2003/0177341 A1 | 9/2003 | Devillers |
| 2003/0182276 A1 * | 9/2003 | Bossman et al. ................. 707/3 |
| 2003/0182624 A1 | 9/2003 | Large |
| 2003/0212662 A1 | 11/2003 | Shin et al. |
| 2003/0212664 A1 | 11/2003 | Breining et al. |
| 2003/0226111 A1 | 12/2003 | Wirts et al. |
| 2004/0010752 A1 | 1/2004 | Chan et al. |
| 2004/0043758 A1 | 3/2004 | Sorvari et al. |
| 2004/0044659 A1 | 3/2004 | Judd et al. |
| 2004/0064466 A1 * | 4/2004 | Manikutty et al. ............ 707/100 |
| 2004/0083209 A1 | 4/2004 | Shin |
| 2004/0088320 A1 | 5/2004 | Perry |
| 2004/0088415 A1 | 5/2004 | Chandrasekar et al. |
| 2004/0103105 A1 | 5/2004 | Lindblad et al. |
| 2004/0103282 A1 | 5/2004 | Meier et al. |
| 2004/0128296 A1 * | 7/2004 | Krishnamurthy et al. .... 707/100 |
| 2004/0143581 A1 * | 7/2004 | Bohannon et al. ........... 707/100 |
| 2004/0148278 A1 | 7/2004 | Milo et al. |
| 2004/0163041 A1 | 8/2004 | Engel |
| 2004/0167864 A1 | 8/2004 | Wang et al. |
| 2004/0176958 A1 | 9/2004 | Salmenkaita et al. |
| 2004/0177080 A1 | 9/2004 | Doise et al. |
| 2004/0205551 A1 | 10/2004 | Santos |
| 2004/0210573 A1 | 10/2004 | Abe et al. |
| 2004/0215626 A1 * | 10/2004 | Colossi et al. ................. 707/100 |
| 2004/0220912 A1 | 11/2004 | Manikutty et al. |
| 2004/0220927 A1 | 11/2004 | Murthy et al. |
| 2004/0220946 A1 | 11/2004 | Krishnaprasad et al. |
| 2004/0225680 A1 | 11/2004 | Cameron et al. |
| 2004/0230667 A1 | 11/2004 | Wookey |
| 2004/0230893 A1 | 11/2004 | Elza et al. |
| 2004/0236762 A1 * | 11/2004 | Chaudhuri et al. ........... 707/100 |
| 2004/0255046 A1 | 12/2004 | Ringseth et al. |
| 2004/0260683 A1 * | 12/2004 | Chan et al. ........................ 707/3 |
| 2004/0267760 A1 | 12/2004 | Brundage et al. |
| 2004/0268244 A1 | 12/2004 | Levanoni et al. |
| 2005/0004907 A1 * | 1/2005 | Bruno et al. ...................... 707/4 |
| 2005/0010896 A1 | 1/2005 | Meliksetian et al. |
| 2005/0027701 A1 * | 2/2005 | Zane et al. ........................ 707/3 |
| 2005/0038688 A1 | 2/2005 | Collins et al. |
| 2005/0050016 A1 | 3/2005 | Stanoi et al. |
| 2005/0050058 A1 | 3/2005 | Jain et al. |
| 2005/0050092 A1 | 3/2005 | Jain et al. |
| 2005/0065949 A1 | 3/2005 | Warner et al. |
| 2005/0091188 A1 | 4/2005 | Pal et al. |
| 2005/0097084 A1 | 5/2005 | Balmin et al. |
| 2005/0120031 A1 | 6/2005 | Ishii |
| 2005/0138047 A1 | 6/2005 | Liu et al. |
| 2005/0203933 A1 * | 9/2005 | Chaudhuri et al. ........... 707/101 |
| 2005/0228786 A1 | 10/2005 | Murthy et al. |
| 2005/0228791 A1 | 10/2005 | Thusoo et al. |
| 2005/0228792 A1 | 10/2005 | Chandrasekaran et al. |
| 2005/0228818 A1 | 10/2005 | Murthy et al. |
| 2005/0229158 A1 | 10/2005 | Thusoo et al. |
| 2005/0257201 A1 | 11/2005 | Rose et al. |
| 2005/0289125 A1 | 12/2005 | Liu et al. |
| 2005/0289175 A1 | 12/2005 | Krishnaprasad et al. |
| 2006/0021246 A1 | 2/2006 | Schulze et al. |
| 2006/0031204 A1 | 2/2006 | Liu et al. |
| 2006/0031233 A1 | 2/2006 | Liu et al. |
| 2006/0074901 A1 | 4/2006 | Pirahesh et al. |
| 2006/0129584 A1 | 6/2006 | Hoang et al. |
| 2007/0011167 A1 | 1/2007 | Krishnaprasad et al. |
| 2007/0043696 A1 | 2/2007 | Haas et al. |
| 2007/0083809 A1 | 4/2007 | Tarachandani et al. |
| 2007/0271305 A1 | 11/2007 | Chandrasekar et al. |
| 2008/0091623 A1 | 4/2008 | Idicula et al. |
| 2008/0222087 A1 | 9/2008 | Balmin et al. |

FOREIGN PATENT DOCUMENTS

| | | |
|---|---|---|
| EP | 1 241 589 A2 | 9/2002 |
| WO | WO 97/46956 | 12/1997 |
| WO | WO 00/14632 | 3/2000 |
| WO | WO 00/49533 A2 | 8/2000 |
| WO | WO 01/59602 A1 | 5/2001 |
| WO | WO 01/42881 A2 | 6/2001 |
| WO | WO 01/61566 A1 | 8/2001 |
| WO | WO 03/027908 A2 | 4/2003 |
| WO | WO 03107576 | 12/2003 |
| WO | WO 2006026534 | 3/2006 |

OTHER PUBLICATIONS

P. Bohannon et al., "From XML Schema to Relations: A Cost-Based Approach to XML Storage", IEEE ICDE, 2002.*

McHugh et al., "Query Optimization for XML", Proceedings of the 25th VLDB Conference, Edinburgh, Scottland, 1999, pp. 315-326.*
Halverson et al., "Mixed Mode XML Query Processing", Proceedings of the 29th VLDB Conference, Berlin, Germany, Sep. 12-13th, 2003, pp. 225-236.*
"TIMBER: A native XML database" by Jagadish et al., The VLDB Journal (2002), published online Dec. 19, 2002.*
Estimating the Selectivity of XML Path Expressions for Internet Scale Applications, by Aboulnaga et al, Proceedings of the 27th VLDB Conference, Roma, Italy, 2001.*
Statistical Synopses for Graph-Structured XML Databases, by Polyzotis et al., ACM SIGMOD Jun. 4-6, 2002, Madison, Wisconsin, USA.*
Structured Information Retrieval in XML documents, by Kotsakis, SAC 2002, Madrid, Spain.*
George Lumpkin, et al., Oracle Corporation, "Query Optimization in Oracle9i," An Oracle White Paper, Feb. 2002, pp. 1-29.
Oracle Corporation, "Oracle9iDatabase Daily Feature, Oracle9iOptimizer Statistics Collection Enhancements," Apr. 23, 2003, http://otn.oracle.com/products/oracle9i/daily/apr23.html?_template=/ocom/technology/con, pp. 1-2.
Donald K. Burleson, Oracle Corporation, "Cost Control: Inside the Oracle Optimizer," 2003, http://otn.oracle.com/oramag/columns/2003/techarticles/burleson_cob_ptl.html, data retrieved Jul. 16, 2004, 15 pages.
Sandeepan Banerjee, Oracle Corporation, "Oracle 9i 'Project XDB'—The XML Database," http://www.grandpoohbah.net/Sandeepan/IOUG2001XDB.htm, data retrieved Feb. 6, 2004, pp. 1-18.
Oracle Corporation, "Resource_View and Path_View," Oracle9iXML Database Developer's Guide—Oracle XML DB, Release 2 (9.2), Part No. A96620-02, 2002, http://www.cs.utah.edu/classes/cs5530/oracle/doc/B10501_01/appdev.920/a99620/xdb19res, data retrieved Feb. 6, 2004, pp. 1-13.
Oracle Corporation, "Under_Path," Oracle9iSQL Reference, Release 2 (9.2), Part No. A96540-01, 1996, 2002, http://www.lc.leidenuniv.nl/awcourse/oracle/server.920/a96540/conditions12a.htm, data retrieved Feb. 6, 2004, pp. 1-2.
Zhang, Xin et al., "Honey, I Shrunk the XQuery!—An XML Algebra Optimization Approach," Submission for WIDM'02, IEEE XP-002316448, 14 pages.
Zisman et al., "Using XML to Build Consistency Rules for Distributed Specifications," Proceedings of the Tenth International Workshop on Software Specification and Design (IWSD'00), IEEE 2000, 8 pages.
Higgins, Shelle, Oracle Corporation, "Oracle9i, Application Developer's Guide—XML," Release 1 (9.0.1), Jun. 2001, Part No. A88894-01, pp. 1-1,362. (split up into five parts).
Higgins, Shelley, Oracle Corporation, "Oracle9i, Case Studies—XML Applications," Release 1 (9.0.1), Jun. 2001, Part No. A88895-01, pp. 1-462.
W3C, "XML Schema Part 1: Structures," W3C Recommendation, May 2, 2001, http://www.w3.org/TR/2001/REC-xmlschema-1-20010502/, pp. 1-203.
W3C, "XML Schema Part 2: Datatypes," W3C Recommendation, May 2, 2001, http://www.w3.org/TR/2001/REC-xmlschema-2-20010502/, pp. 1-146.
Oracle, "Oracle9i Application Server, Administrator's Guide," Release 2 (9.0.2), May 2002, Part No. A92171-02, Part No. A92171-02, pp. 1-392 (submitted in two parts).
W3C, "XML Syntax for XQuery 1.0 (XQueryX)," W3C Recommendation, Working Draft, Dec. 19, 2003, retrieved from the internet:<http://www.w3.org/TR/2003/WD-xquery-20031219>, retrieved on Apr. 14, 2005, pp. 1-55.
W3C, "XQuery 1.0 and XPath 2.0 Data Model," W3C Working Draft dated Apr. 4, 2005, 91 pages.
W3C, "XQuery 1.0: An XML Query Language," W3C Recommendation, Working Draft, Oct. 29, 2004, retrieved from the internet:<http://www.w3.org/TR/2004/WD-xquery-20041029>, retrieved on Apr. 14, 2005, pp. 1-189.
W3C, "XQuery 1.0: An XML Query Language," W3C Working Draft dated Apr. 4, 2005, 170 pages.

Wallach, Deborah A. et al., "ASHs: Application-specific handlers for high-performance messaging" (1996) ACM Press, pp. 1-13.
Yoshikawa, Masatoshi et al., "XRel: A Path-Based Approach to Storage and Retrieval of XML Documents Using Relational Databases", XP-001143686, ACM Transactions on Internet Technology (2001), pp. 110-141.
Zemke, Fred, "XMLQuery," Change Proposal, ISO/IEC JTC1/SC32 WG3:SIA-nnn ANSI NCITS H2-2004-02lrl, Mar. 14, 2004, 29 pages.
Zhang, Hui et al., "XQuery rewriting at the relational algebra level," Computer Systems Science and Engineering, vol. 18, No. 5, Sep. 2003, IEEE XP-009056809, pp. 241-262.
Zhang, Wansong, et al., "An Encoding Scheme for Indexing XML Data," E-Commerce and E-Service, 2004, XP-010697639, pp. 526-529.
Goldman, Roy, et al., "DataGuides: Enabling Query Formulation and Optimization in Semistructured Databases", The International Conference on Very Large Data Bases, 1997, 21 pages.
Microsoft, "Microsoft Computer Dictionary", 2002, Microsoft Press, Fifth Edition, 3 pages.
Girardot et al., "Millau: an encoding format for efficient representation and exchange of XMLover the Web", IBM Almaden Research Center, 24 pages.
Shankar Pal et al., "Indexing XML Data Stored in a Relational Database", Proceedings of the 30th VLDB Conference, 2004, 12 pages.
MacKenzie et al., "Finding Files", FindUtils, Version 4.1.2, Source Code, GNU.org, Nov. 1997, source files, code. C, 22 pages.
Cormen et al., "Introduction to Algorithms", MIT Press, 2001, 2nd Edition, 4 pages.
Al-Khalifa, S. et al., "Structural Joins: A Primitive for Efficient XML Query Pattern Matching", Feb. 26-Mar. 1, 2002, Data Engineering, 2002. Proceedings. 18th International Conference, pp. 141-152.
Banerjee, Vishu Krishnamurthy et al.,"Oracle8i—The XML Enabled Data Management System"—Oracle Corporation, Mar. 2000 IEEE pp: 561-568.
Bourret, R. et al.: A generic Load/Extract Utility for Data Transfer Between XML Documents and Relational Databases, Jun. 8-9, 2000, IEEE Computing SOC., pp. 134-143.
Braga, Daniele,et al., "A Graphical Environment to Query XML Data with Query," Proceedings of the Fourth International Conference on Web Information Systems Engineering (WISE'03), 2003, IEEE, 10 pages.
Chae, Mi-Ok, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.
Chakraborty, Krishnendu, "The XML Garbage Collector", The Source for Developers, Sun Developer Network Site XP-002297849, Mar. 2002.
Kudrass, Thomas, "Management of XML Documents Without Schema in Relational Database Systems," Information and Software Technology, vol. 44, No. 4, Mar. 31, 2002, XP-004347776, pp. 269-275.
Lo et al., "XAS: A System for Accessing Componentized, Virtual XML Documents," IEEE, 2001, pp. 493-502.
Manolescu, Dragos "Review of Metadata solutions: using metamodels, repositories, XML, and enterprise portals to generate information on demand by Adrienne Tannenbaum", Mar. 2003, ACM Press, vol. 28, Issue 2, p. 38.
McHugh, Jason, et al. "Indexing Semistructured Data," Stanford Science Department, 1998, XP-002248313, pp. 1-21.
Melton, Jim, "ISO-ANSI Working Draft, XML-Related Specifications (SQL/XML)," WG3: DRS-020, H2-2002-365, Aug. 2002, 154 pages.
Murthy, Ravi et al., "XML Schemas in Oracle XML DB," Proceedings of the 29th VLDB Conference, 2003, IEEE XP-002353604, pp. 1009-1018.
Myllymaki, Jussi, "Effective Wed data Extraction with Standard XML Technologies," WWW10, May 1-5, 2001, pp. 689-696.
Noser, Hansrudi, et al., "Dynamic 3D Visualization of Database-Defined Tree Structures on the WWW by Using Rewriting Systems," 2000, IEEE, XP-002262516, pp. 247-254.

Oracle, "Oracle iFS (Internet File System)," Mar. 1999, XP-002204710, 3 pages.

Shanmugasundaram, J., et al. "Querying XML Views of Relational Data," Proceedings of the 27$^{th}$ Very Large Databases Conference, Rome, Italy, Sep. 2001, pp. 261-270.

Thekkath, Chandramohan A. et al., "Implementing network protocols at user level" (1993) ACM Press, pp. 64-73.

Vion-Dury, Jean-Yves, "XPath on left and right sides of rules: toward compact XML tree rewriting through node patterns", 2003, ACM Press, pp. 19-25.

Vorthmann, S., et al. "Beyond Schemas, Schema Adjuncts and the Outside World," Markup Languages, Online!, vol. 2, No. 3, Jun. 2000, pp. 1-8.

W3C, "Extensible Markup Language (XML) 1.0 (Third Edition)", W3C Recommendation, dated Feb. 4, 2004, 34 pages.

W3C, "XML Fragment Interchange," W3C Working Draft, Jun. 30, 1999, XP-002167090, 17 pages.

W3C, "XML Path Language (XPath) 2.0," W3C Recommendation, Working Draft, Oct. 29, 2004, retrieved from the internet:<http://www.w3.org/TR/2004/WD-xpath20-20041029>, retrieved on Apr. 14, 2005, pp. 1-111.

W3C, "XML Path Language (XPath) 2.0," W3C Working Draft Dated Apr. 4, 2005, 89 pages.

Feng Peng and Sudarshan S. Chawathe, "XPath Queries on Streaming Data" (Proceedings of the 2003 ACM SIGMOD International Conference on Management of Data), pp. 431-442.

Chen, Ruey-Shun et al., "Developing an XML framework for metadata system", Trinity College Dublin, Proc. of the 1st Inter. Sympo. on Information and Communication, 2003, pp. 262-272.

Cheng, Josephine, et al., "IBM DB2 XML Extender, An end-to-end solution for storing and retrieving XML documents.," IEEE, ICDE'00 Conference, San Diego, Feb. 2000, 128 pages.

Choi, Byron et al., "The XQuey Formal Semantics: A Foundation for Implementation Optimization," May 31, 2002, IEEE XP-002353605, 15 pages.

Cooper, Brian F. et al., "A Fast Index for Semistructured Data ," Proceeding of the International Conference on Very Large Databases, 2001, XP-002303292, pp. 341-350.

Dayen, I., "Storing XML in Relational Databases", XML.com XP-002275971(1998-2004) pp. 1-13.

Diao, Y. et al., "Path Sharing and Predicate Evaluation for High-Performance XML Filtering" XP-002344354 ACM Transactions on Database Systems (2003), pp. 467-516.

Diao, Y. et al., "YFilter: Efficient and Scalable Filtering of XML Documents" IEEE (2002) 2 pages.

Drake, Mark et al., Oracle Corporation, "Understanding the Oracle9i XML Type," Nov. 1, 2001, http://otn.oracle.com/oramag/oracle/01-nov/o61xml.html?_template=/ocom/technology, data retrieved Jun. 29, 2004, pp. 1-5.

Funderbunk, J. et al., "XML programming with SQL/XML and XQuery", IBM Systems Journal, XP-002295973 (2002), pp. 642-665.

Gennick, Johnathan, Oracle Corporation, "SQL in, XML out," May 1, 2003, http://otn.oracle.com/oramag/oracle/03-may/o33xml.html?_template=/ocom/technology, data retrieved Jun. 29, 2004, pp. 1-4.

Helmer, S. et al., "Optimized Translations of XPath into Algebraic Expressions Parameterized by Programs Containing Navigational Primitives" IEEE (2002) 10 pages.

Oracle, "Hierarchical Queries", Oracle9i SQL Reference, Release 2 (9.2), Part No. A96540-01, XP-002295972, Mar. 2002, pp. 8-3 to 8-7.

Jajodia, Sushil, et al., "Toward a Multilevel Secure Relational Data Model," ACM, 1991, 8393 SIGMOD Record, Jun. 20, 1991, No. 2, New York, US.

Kang, Ji-Hoon et al., "An XQuery Engine for Digital Library Systems that support XML data," Proceedings of the 2004 International Symposium on Application and the Internet Workshops, IEEE XP-0010684128, 5 pages.

Katz, Howard et al., "Integrating XQuery and Relational Database Systems," Chapter 7—XQuery from the Experts: A Guide to the W3C XML Query Language, Addison Wesley Professional, Aug. 22, 2003, ISBM 978-0-321-18060-5, pp. 353-391.

Khan, Latifur, et al, "A Performance Evaluation of Storing XML Data in Relational Database Management Systems,"ACM-2001 (pp. 31-38).

Oracle, "Oracle9i XML Database Developer's Guide—Oracle XML DB," Release 2 (9.2), Oct. 2002, Part No. A96620-2, chapters 5 (86 pages), 10 (55 pages) & 11 (24 pages), (submitted in three separate pdf files).

Park, Joon S., "Towards Secure Collaboration on the Semantic Web" (2003) ACM Press, vol. 33, Issue 2, pp. 1-10.

Peng, Feng et al., "XPath queries on streaming data", 2003, ACM Press, pp. 431-442.

Ramakrishnan, Raghu et al., "SRQL: Sorted Relational Query Language", Jul. 1-3, 1998 IEEE pp: 84-95.

Rao, Herman Chung-Hwa, et al., "An Overview of the Internet File System," 1997, IEEE, XP-002204711, pp. 474-477.

Ricardo, Catherine, "Database Systems: Principles, Design, & Implementation," 1990, MacMillian Publishing Co., pp. 357-361, 379-380.

Ruey-Shun, Chen, et al., "Developing an XML framework for metadata system", Trinity College Dublin, Proc. of the 1st Inter. Sympo. on Information and Communication, 2003, pp. 267-272.

Schmidt et al. — "Efficient Relational Storage and Retrieval of XML Documents"—CWI, The Netherlands 2000, (pp. 1-6).

Schmidt et al., "Why and How to Benchmark XML Databases," SIGMOND Record, vol. 3, No. 3, Sep. 2001, pp. 27-32.

* cited by examiner

COST-BASED OPTIMIZER FOR AN XML DATA REPOSITORY WITHIN A DATABASE

FIELD OF THE INVENTION

The present invention relates generally to database systems and, more specifically, to a cost-based optimizer for an XML data repository within a relational database management system (RDBMS).

BACKGROUND OF THE INVENTION

Database Query Optimizer

In a database system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

A database management system (DBMS) retrieves and manipulates data in response to receiving a database statement. Typically, the database statement conforms to a database language, such as the Structured Query Language (SQL). A database statement can specify a query operation, a data manipulation operation, or a combination thereof. A database statement that specifies a query operation is referred to herein as a query.

When a DBMS receives a query, the DBMS may generate an execution plan. An execution plan is important because it defines the steps and operations performed by a DBMS to service a request. DBMSs often include an optimizer for generating execution plans that are optimized for efficiency. When determining what steps to include in an execution plan, and the order in which the steps are performed, a DBMS accounts for many factors that affect efficiency. One important factor that is considered is the computational cost associated with executing a query according to a given execution plan. A cost-based optimizer (CBO) evaluates all possible data access paths for a query and determines the most efficient execution plan based on the cost of all access paths.

For example, a query with two ANDed predicates will request rows that satisfy both predicates. If the column(s) in the first predicate is indexed, then a DBMS may generate an execution plan that uses the index to access data more efficiently.

To determine an efficient execution plan for a query, the query optimizer relies on persistently stored statistics to estimate the costs of alternative execution plans, and chooses the plan with the lowest overall estimated cost. The statistics are computed and stored before the query is received. Statistics are used to estimate important optimizer cost parameters such as the selectivity of various predicates and predicate clauses (e.g., the fraction or percentage of rows in a table that match some condition represented in a predicate or predicate clause). Examples of statistics include table cardinalities (the number of rows in a table), the number of distinct values for a column, the minimum and maximum values in the column, and histograms, which is data that specifies the distribution of values in the columns, e.g., the number of rows that have particular column values for a column or the number of rows that have a column value that falls within a range. However, for some database statements, statistics needed by the query optimizer may not be available, such as statistics for certain repositories managed by the DBMS.

XML Database

With support for XML type data as a native data type in information management systems, such as a relational database system (RDBMS) or object-relational database system (ORDBMS), the contents of XML documents can be stored in such systems. For example, in the context of a relational database, XML data may be stored in columns of a relational table and users can query the XML data via a SQL query.

One known implementation of an XML data repository, which provides the mechanisms for the storage of XML data in a RDBMS and access thereto, is referred to herein as an XML database ("XDB"). The key XDB-enabling technologies can be grouped into two major classes: (1) XML data type, which provides a native XML storage and retrieval capability strongly integrated with SQL; and (2) XDB repository, which provides foldering, access control, versioning, and the like, for XML resources.

The XML data type can be used as a datatype of a column of a relational table, and includes a number of useful methods to operate on XML data. XML type data can be stored, for example, as a LOB (large object) or according to object-relational storage. If stored as a LOB, XML data may be accessed via a text index, and if stored object relationally, XML data may be accessed via a btree index, for example. Some benefits that result from the XML data type include support for XML schemas, XPath searches, XML indexes, XML operators, XSL transformations, and XDB repository views (e.g., RESOURCE_VIEW and PATH_VIEW, described hereafter).

The XDB repository provides a repository for managing XML data. The XDB repository provides important functionality with respect to the XML data, for example, access control lists (ACL), foldering, WebDAV (Web-based Distributed Authoring and Versioning), FTP (File Transfer Protocol) and JNDI (Java Naming and Directory Interface) access, SQL repository search, hierarchical indexing, and the like.

XDB repository views provide a mechanism for SQL access to data that is stored in the XDB. Data stored in XDB repository via protocols like FTP, WEBDAV or JNDI can be accessed in SQL via these views. XDB provides two repository views to enable SQL access to the repository: RESOURCE_VIEW and PATH_VIEW. Both views contain the resource properties, the path names and resource IDs. The PATH_VIEW has an additional column for the link properties.

With prior approaches to cost-based optimizers, the optimizers were unable to retrieve the real cost of a query on XDB repository views, so the optimizer relied on default statistics to choose a query execution plan. Since the CBO is not aware of the implementation of XDB repository views and user defined operators associated to the views, CBO can only estimate the default statistics, which is far from being accurate. Thus, the result is sub optimal query execution plans. For example, in the absence of an optimizer mechanism for an XDB repository, the CBO may choose a sub optimal query plan involving both a hierarchical index scan and a btree index scan, where the selectivity of the predicate with the XDB operator is very high while the selectivity of the predicate with the btree index on it is very low. In such a scenario, the optimal query plan would be a btree index scan followed by functional evaluation of the repository view operators.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Techniques are described for applying cost-based optimizer functionality to an XML data (also referred to as XML resource) repository within a database.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview of Embodiments

Cost-based optimizer functionality for an XML database repository provides means for optimizing the execution of database queries that access XML resources in the database repository. Statistics about XML resources that are stored in the database repository are gathered, stored and utilized by a query optimizer to compute computational costs associated with each of multiple methods of accessing (referred to as "access paths") particular XML resources requested in a database query. Hence, the optimizer is able to select the most efficient query execution plan based on the costs of possible access paths. For example, with respect to one existing commercially available XML repository within a database management system, execution of SQL queries on XML database repository views (e.g., a RESOURCE_VIEW and/or PATH_VIEW) that contain operators such as UNDER_PATH and/or EQUALS_PATH can be optimized based on the cost of the possible access paths.

In one embodiment, specific statistics about the hierarchical structure of XML resources stored in the XML database repository are gathered, stored in a relational table in the database management system, and used to compute the selectivity of query predicates and the index cost associated with traversing one or more indexes to access the requested XML resources. In a related embodiment, the function cost associated with the functional evaluation of the repository view operators is also computed. In one embodiment, the index cost comprises the computational cost associated with CPUs used for accessing the resources and the computational cost associated with reading data (or "disk") blocks in which portions of the index are stored.

Hierarchically-Structured XML Data

XML data can be organized in a hierarchical structure which begins at a root node and in which each level of the structure contains one or more nodes. Each node is either a container node (or simply a "container") or a file. For example, a container node may represent a folder or directory, whereas a file has contents. An XML file contains XML elements and attributes. Files and empty containers are all leaf nodes.

Figure 1:
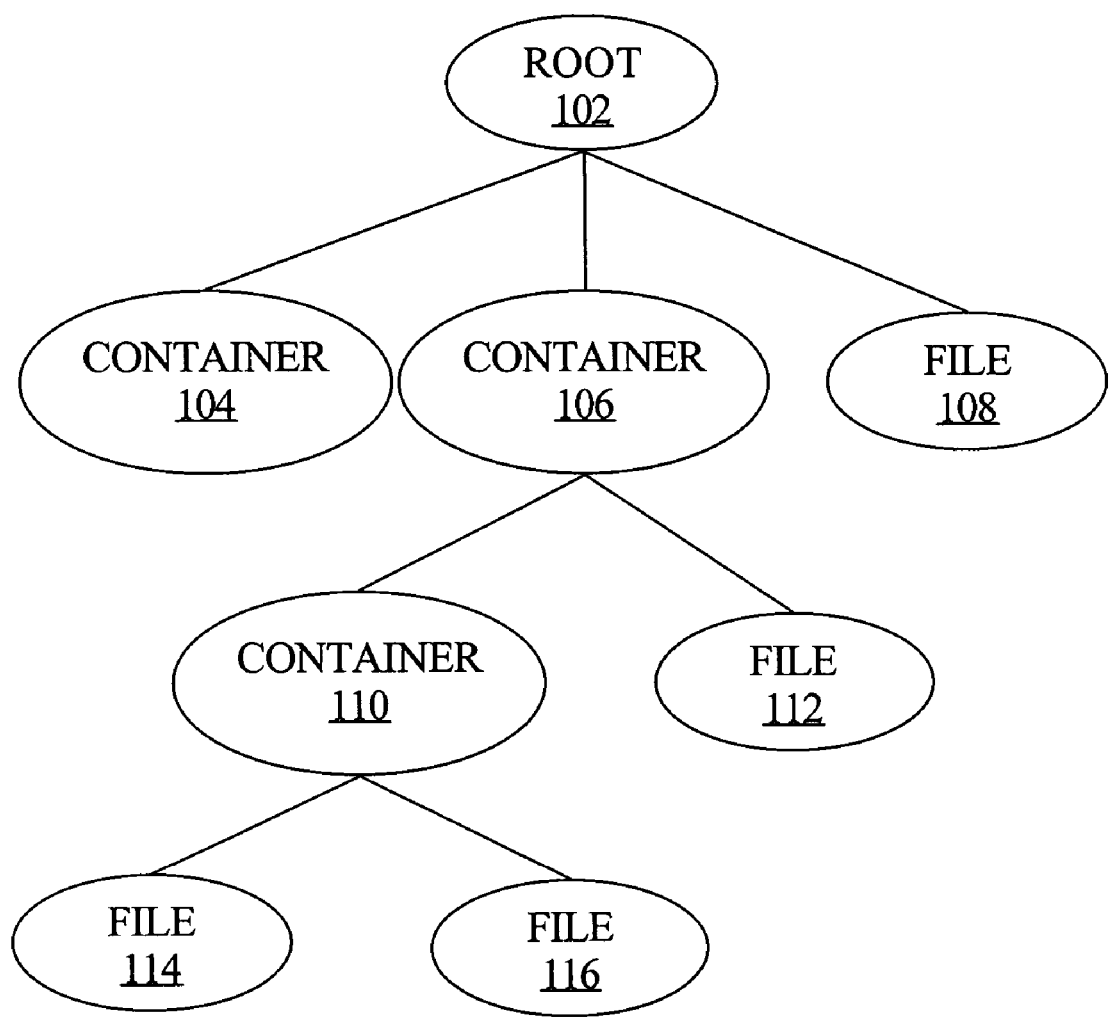
FIG. 1 is a diagram that illustrates hierarchically-organized data.

FIG. 1 is a diagram that illustrates hierarchically-organized data. In FIG. 1, root 102 is the root node; container 104, container 106, and container 110 are container nodes; and file 108, file 112, file 114, file 116, and empty container 104 are leaf nodes. Container 104 is illustrated as an empty container node, e.g., a folder containing no files, and is, therefore, considered a leaf node. FIG. 1 is a simplified representation of a set of hierarchically-structured data, because the structure of XML data that is stored in an XML repository (see XDB 304 of FIG. 3) within a database management system (see DBMS 302 of FIG. 3) is typically much more complex.

Since XML files, referred to herein as "resources" or "data", can be organized in a hierarchical structure, a hierarchical index may be constructed for the XML files. As embodiments are described hereafter, at least a portion of the cost of accessing a given resource stored in an XML database repository includes the cost of accessing the given resource from a table in which the given resource is stored, by traversing an index on the table. One technique for indexing hierarchically-structured resources is to construct and maintain a hierarchical index as described in U.S. Pat. No. 6,427,123 entitled "Hierarchical indexing for accessing hierarchically organized information in a relational system" and U.S. Pat. No. 6,571,231 entitled "Maintenance of hierarchical index in relational system."

Method for Computing Costs of Data Access Paths

Figure 2:
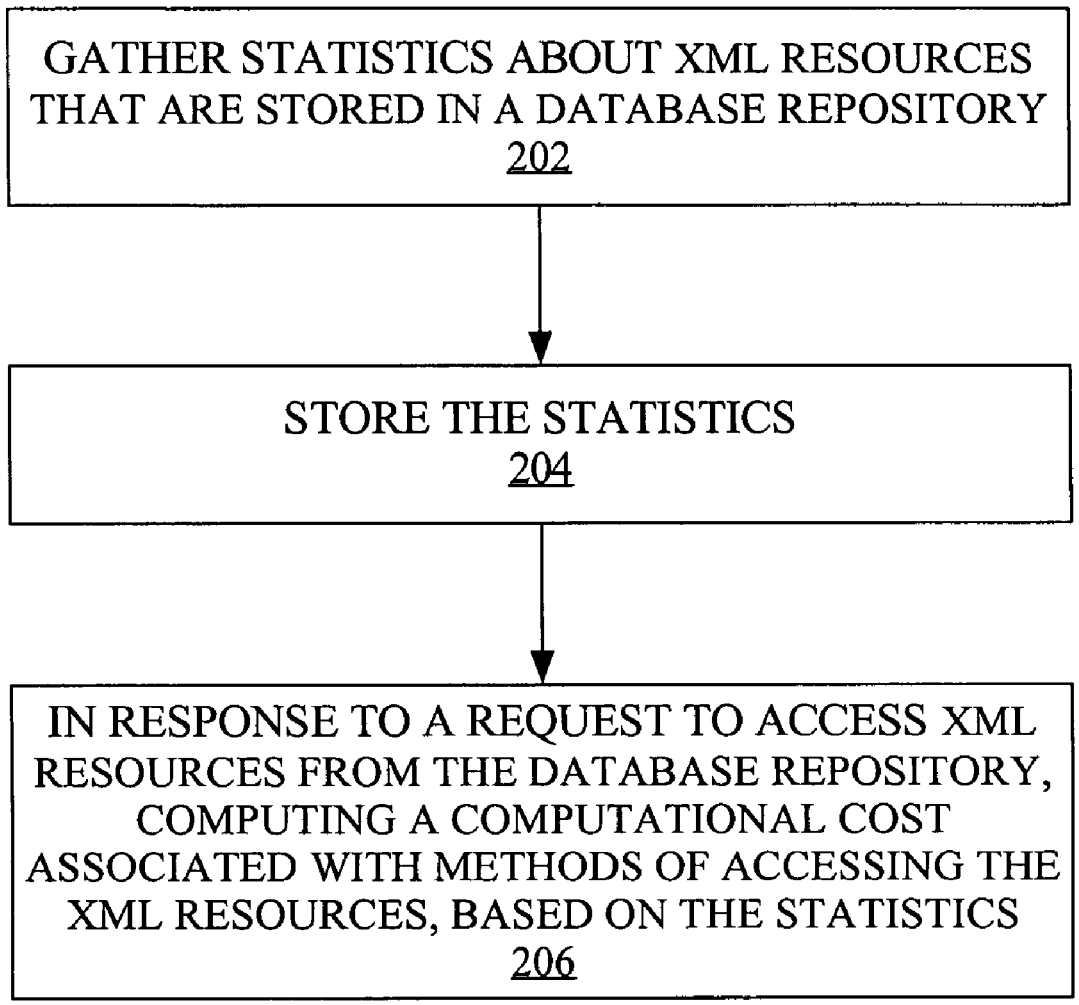
FIG. 2 is a flow diagram that illustrates a method for computing computational costs associated with accessing XML resources stored in an XML database repository, according to an embodiment of the invention.

FIG. 2 is a flow diagram that illustrates a method for computing computational costs associated with accessing XML resources stored in an XML database repository, according to an embodiment of the invention. As previously discussed, one known implementation of mechanisms for the storage of XML data in a RDBMS, and access thereto, is referred to herein as an XML database ("XDB"), part of which is an XDB repository. The term "XDB repository" is used to reference a particular implementation of a repository for XML data within a relational database management system, and the term "XML database repository" is used herein to generally reference any implementation of a repository for XML data within a database management system. The method illustrated in FIG. 2 is in the context of an XML database repository and, therefore, applicable to any implementation of a repository for XML data within a database management system.

Gathering Statistics About XML Resources

At block 202, statistics about XML resources that are stored in an XML database repository are gathered. When a node is said to be "under" a particular node, it means (1) that the node is at a level, in a hierarchy in which the XML data is organized, further from the root node than the particular node, and (2) that the node is accessible from the database repository via a path through the particular node. In reference to FIG. 1, file 114 and file 116 are under container 110; container 110 and file 112 are under container 106; and so on.

In one embodiment, the following statistics are gathered, to provide bases for computing computational costs associated with one or more access paths to a given XML resource stored in an XML database repository. Furthermore, examples of column names for a table or tables in which each of the respective statistics are stored, are provided in brackets for subsequent reference thereto. Such statistics support cost computations for accessing a node, e.g., a file or document, in which a requested XML resource is logically stored (e.g., selectivity, as described hereafter). Other mechanisms are utilized to compute costs for accessing a particular resource associated with a node (e.g., index cost, as described hereafter).

(1) Total number of nodes (e.g., files and containers) under a particular node [resoid], i.e., at all levels under the particular node; [total_rows].

(2) Immediate number of nodes (e.g., files and containers) under a particular node [resoid], i.e., at the level immediately under the particular node; [fan_out].

(3) Total number of containers under a particular node [resoid], i.e., at all levels under the particular node; [total_containers].

(4) Immediate number of containers under a particular node [resoid], i.e., at the level immediately under the particular node; [immediate_containers].

(5) The depth of a particular node, i.e., how many levels from the root node; [depth].

With the known implementation of the XDB repository, statistics about XML resources stored in the XDB repository can be collected or deleted via an ANALYZE command, described in Chapter 30 of "Oracle9i Database Administrator's Guide Release 1 (9.0.1), Part Number A90117-01", or a DBMS_STATS package, described in Chapter 3 of "Oracle9i Database Performance Guide and Reference Release 1 (9.0.1), Part Number A87503-02". Other implementations can collect statistics using similar functionalities.

In one embodiment, one or more of the foregoing statistics are gathered for each container node, rather than all of the statistics. Hence, a particular implementation of the techniques described herein may not gather or use all of the foregoing five statistics for cost computations.

In one embodiment, only queries that contain predicates or operators with a depth of one or infinity are optimized, because such queries represent the majority of practical scenarios. A depth of infinity is the default depth of a predicate or operator when a depth is not specified.

Storing Statistics About XML Resources

At block 204, the statistics are stored. In one embodiment, the statistics are stored in a relational table of a database of which the XML database repository is part, such as a relational table in a RDBMS. Hence, the resoid column of such a table links the statistics row to a node in the repository. Based on the embodiment in which optimization is only performed for queries with a depth of one or infinity, total_rows and total_containers store statistics relevant to infinite depth, and fan_out and immediate_containers store statistics relevant to a depth of one. The statistics stored in the depth column are used to enhance search and identification of a given resource.

In one embodiment, the table in which the statistics are stored (the "statistics table") is implemented as a schema-based XML table. Each row in the statistics table corresponds to a node in the XML data hierarchy. This approach leverages the potential of keeping the statistics table in a generally consistent form with the rest of the data hierarchy stored in the XML database repository, which is XML-enabled.

Options for implementing storage of the statistics include (1) storing the statistics in a hierarchical index on the table(s) in which the resources are stored ("resource table"), such as a hierarchical index table as described in U.S. Pat. No. 6,427,123; (2) storing the statistics in the resource table; and (3) storing the statistics in a table separate from the resource table. In an embodiment, the statistics are stored in a separate table (option 3 above), such as a schema-based table of XML data type.

Computing Costs of XML Resource Access Paths

At block 206, in response to a request for access to XML resources from the database repository, a computational cost associated with one or more methods for accessing the requested XML resources (i.e., access paths) is computed, based on at least a portion of the statistics that are gathered at block 202. For example, the computational cost of a SQL query is computed as described hereafter, in response to receiving the SQL query at a database server.

In one embodiment, the computational cost comprises selectivity and index cost (both are described hereafter). In an alternative embodiment, the computational cost comprises one from the group consisting of selectivity and index cost. However, the specific parameters that are calculated as components of the computational cost may vary from implementation to implementation.

Selectivity

In one embodiment, an optimizer uses the statistics stored in the statistics table to calculate the selectivity of predicates containing operators on the XML database repository. For example, the optimizer calculates the selectivity of predicates containing path-related operators associated with the hierarchy in which the XML data is organized.

In one embodiment, a path-related operator is an operator that determines whether a particular XML resource can be located in a specified column of the resource table in said database repository through a particular specified path through a portion of the hierarchy. In other words, the operator determines whether the particular XML resource is "under" the specified path. With the known implementation of the XDB repository, such an operator is referred to as UNDER_PATH; however, embodiments are not limited to use of that specific operators.

In one embodiment, a path-related operator is an operator that determines whether a particular XML resource can be located in a specified column of the resource table in said database repository at a terminal location of a particular specified path through a portion of the hierarchy. With the known implementation of the XDB repository, such an operator is referred to as EQUALS_PATH; however, embodiments are not limited to use of that specific operators.

Selectivity is defined as a percentage number between zero (0) and one hundred (100). Given a predicate in the following form or with a similar operator specified, where depth is not specified (default is infinity), UNDER_PATH(res, '/p1')=1, where "res" is the column name and "/p1" is the specified path, the selectivity of the predicate can be calculated as:

<selectivity>=(<total_rows('/p1')>/<total_rows (root)>)*100, where the "root" is the node of the hierarchy from which all paths originate.

Given a predicate in the following form or with a similar operator specified, where depth is set to 1, UNDER_PATH(res, 1, '/p1')=1, the selectivity can be calculated as:

<selectivity>=(<fan_out('/p1')>/<total_rows(root)>) *100.

For a predicate that contains an operator like EQUALS_PATH( )=1, or with a similar operator specified, the number of rows in the output is always one (1) and, therefore, its selectivity can be calculated as:

<selectivity>=(1/<total_rows(root)>)*100.

For a predicate that contains an operator such as UNDER_PATH('/') or with a similar operator specified, without specified depth (default is infinity), the selectivity is always 100%, so there is no need to query the statistics table in this case.

Index Cost

In an embodiment, the optimizer defines a cost function for hierarchical indexes on the XML database repository. Whenever an index scan on the hierarchical index (sometimes referred to as traversing the index) is part of a valid access path, the optimizer invokes this index cost function, which computes a composite cost comprising (1) a computational cost value associated with one or more CPUs that are used for traversing the index (e.g., a CPU cost); and/or (2) a computational cost value associated with reading data blocks in which portions of the index are stored (e.g., an I/O cost). Furthermore, a network cost may be included in the index cost.

CPU Cost

The CPU cost portion of the index cost is an estimate of the CPU cost of accessing an XML resource based on the elapsed time to access the resource. A CPU cost function approximates the number of CPU instructions corresponding to a specified time interval. The CPU cost function takes as input the elapsed time of the index scan process, measures CPU units by multiplying the elapsed time by the processor speed of the machine, and returns the approximate number of CPU instructions that should be associated with the index scan.

With a known commercial database management system, the CPU cost associated with a hierarchical index scan to access XML resources can be computed via an ESTIMATE_CPU_UNITS command, described in Chapter 31 of "Oracle9i Supplied PL/SQL Packages and Types Reference Release 1 (9.0.1), Part Number A89852-02". However, embodiments are not limited to use of that specific command, as other implementations can compute the CPU cost using similar functionalities.

I/O Cost

I/O cost is the number of data blocks associated with the hierarchical index table read by the predicate operators of interest, for example, the UNDER_PATH operator. In one embodiment, only the data blocks occupied by containers are of interest when computing the I/O cost. In most scenarios, there is one block per container. However, in scenarios in which a container is across multiple blocks, each block is counted as a different container in the total_containers column in the statistics table.

When queries with a specified depth exceeding 1 are optimized, statistics about the median depth of the various paths of the hierarchy under a given node (median_depth) and the maximum depth of the various paths of the hierarchy under a given node (max_depth) are useful. The distribution of containers under a given node is not included in the statistics table, but the total number of data blocks occupied by containers of interest can be estimated from the following three values: total_containers, median_depth and max_depth.

Given a predicate in the following form or with a similar operator specified, where depth is not specified, UNDER_PATH(res, '/p1')=1, the I/O cost can be calculated as follows:

<IO_cost>:=<total_containers('/p1')>

Given a predicate in the following form or with a similar operator specified,

UNDER_PATH(res, 1, '/p1')=1, where depth is 1, the I/O cost can be calculated as follows:

<IO_cost>:=<immediate_containers('/p1')>

For a predicate containing EQUALS_PATH or with a similar operator specified, the I/O cost is equal to the number of components in the path. For example, accessing a resource specified by "/sys/home/foo/bar" will access three containers ("sys", "home" and "foo") and, therefore, will access three data blocks, to reach the resource "bar".

Function Cost

In one embodiment, another component of the computational cost of accessing an XML resource in an XML database repository is a function cost. The function cost is calculated by the optimizer when functional implementations of path-based operators, such as UNDER_PATH and EQUALS_PATH and similar functions, are valid access paths.

The cost of functional implementation of the UNDER_PATH or similar functioning path-based operator is often primarily from a CONNECT BY or similar functioning clause, which retrieves all the paths for a given resource. Therefore, in one embodiment, the I/O cost and CPU cost of the CONNECT BY are used to calculate the function cost. For example, the I/O cost and CPU cost for the CONNECT BY clause can be determined from an internal EXPLAIN PLAN on the CONNECT BY, i.e., the function cost is retrieved by taking advantage of existing functionality offered by the cost based optimizer. In another embodiment, the function cost is calculated similarly to the index cost described herein, i.e., based on the I/O cost and the CPU cost associated with the functional implementations of the path-based operators.

In one embodiment, however, the I/O cost and CPU cost retrieved from the plan table are multiplied by a constant factor to reflect the fact that the cost of a functional implementation also includes other overhead and is relative to the function cost of an index scan as well as other indexes.

Operating Environment Example

Figure 3:
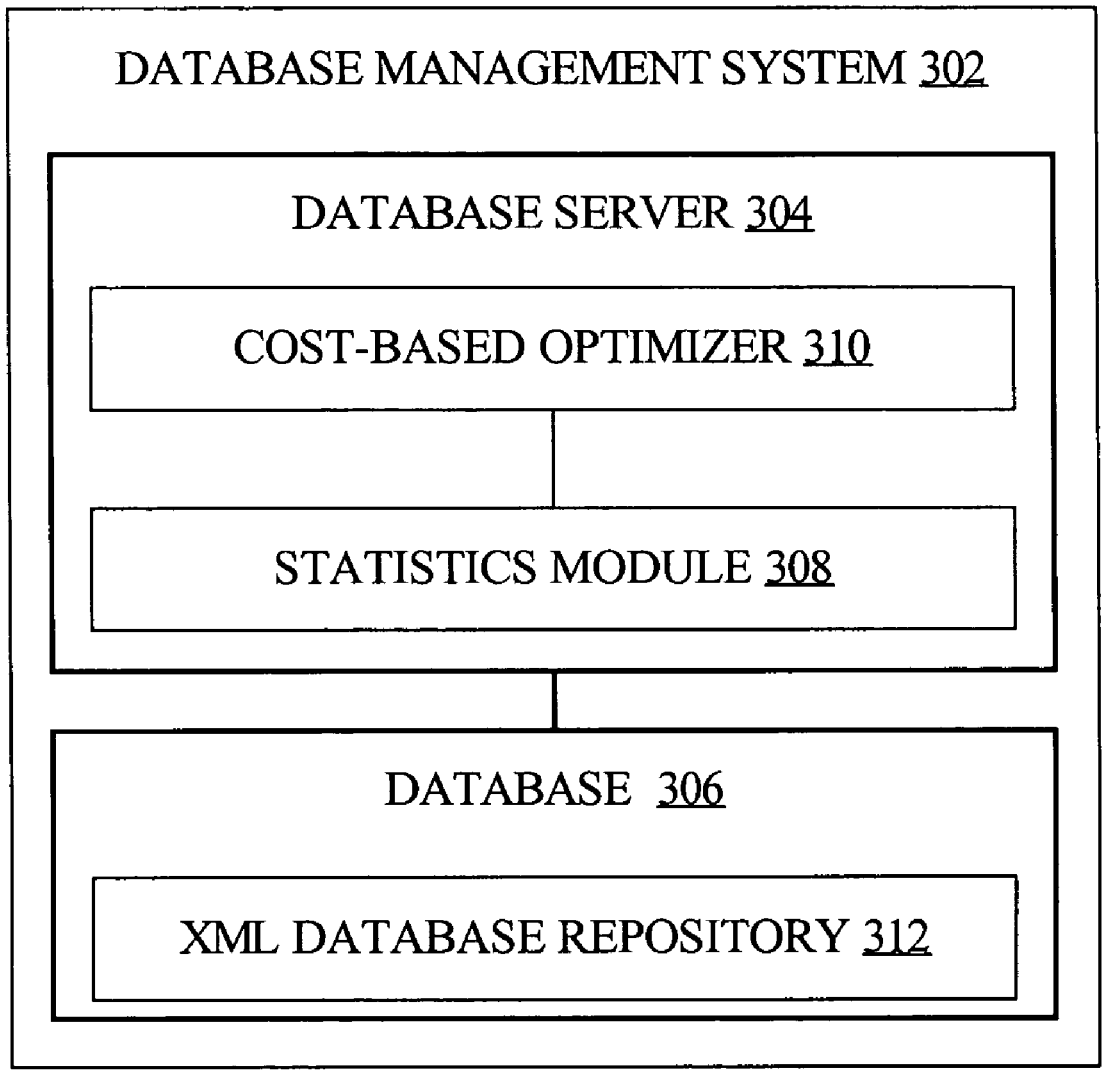
FIG. 3 is a block diagram that illustrates an example of an operating environment in which an embodiment of the invention may be implemented.

FIG. 3 is a block diagram that illustrates an example of an operating environment in which an embodiment may be implemented. The techniques described herein can be implemented in a database management system 302, such as a relational database management system (RDBMS). The database management system 302 comprises a database server 304 and a database 306.

Generally, the database 306 comprises data and metadata that is stored on a persistent memory mechanism, such as a set of hard disks that are communicatively coupled to the database server 304. Such data and metadata may be stored in database 306 logically, for example, according to relational database constructs, multidimensional database constructs, or a combination of relational and multidimensional database constructs. Database 306 comprises a XML database repository 312 for storing XML data, as described herein and on which XML data access requests are made.

Database server 304 is a combination of integrated software components and an allocation of computational resources (such as memory and processes) for executing the integrated software components on a processor, where the combination of the software and computational resources are used to manage a particular database, such as database 306. Among other functions of database management, a database server such as database server 304 typically governs and facilitates access to database 306 by processing requests from clients to access the data in database 306. Database server 304 can be implemented on one or more conventional computer systems, such as computer system 400 illustrated in FIG. 4.

Database server 304 comprises functional components for performing the techniques described herein. These functional components are referred to as a statistics module 308 and a cost-based optimizer (CBO) 310. Each of statistics module 308 and CBO 310 comprise one or more sequences of instructions which, when executed, cause one or more processors to perform certain actions. For example, statistics module 308 comprises instructions for performing blocks 202 and 204 of FIG. 2 and CBO 310 comprises instructions for performing block 206 of FIG. 2.

Hardware Overview

Figure 4:
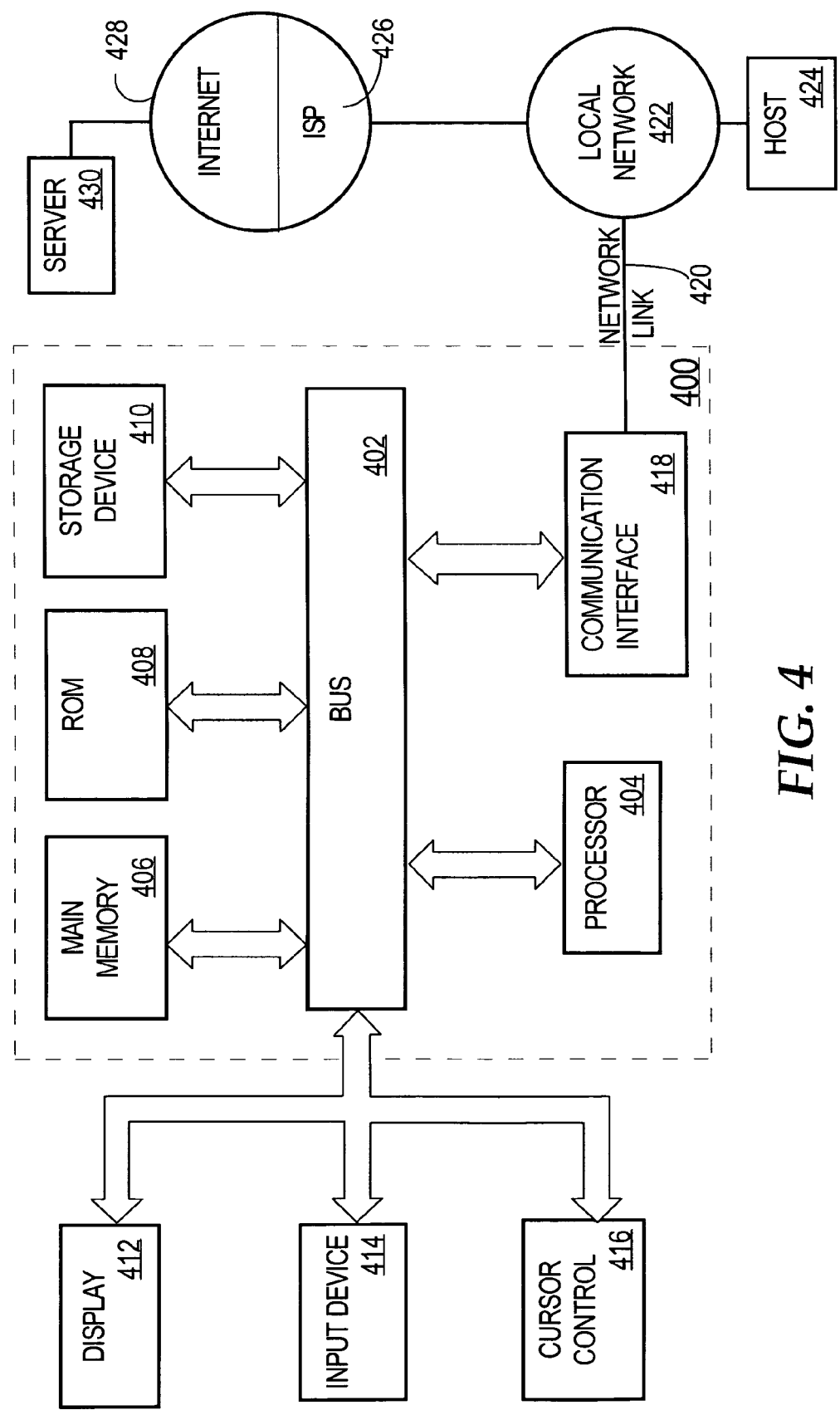
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, embodiments were described herein in reference to SQL-based access to the XML database repository; however, the broad techniques described herein are applicable to other means for accessing XML resources within an XML database repository, such as with FTP (File Transfer Protocol) and HTTP (HyperText Transfer Protocol). Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising the computer-implemented steps of:
    gathering statistics by a database server about nodes that are stored in a database repository that is managed by the database server;
    wherein said nodes form a hierarchy;
    wherein each node is either an XML file or an XML file container;
    wherein at least one node in the hierarchy is an XML file container that contains a plurality of XML files, each of which contains a plurality of XML elements;
    storing said statistics; and
    in response to a request to the database server for access to one or more XML resources from said database repository, the database server computing a computational cost associated with each of two or more methods of accessing said one or more XML resources from said database repository, based on said statistics;
    wherein the two or more methods of accessing said one or more XML resources from said database repository include accessing said one or more XML resources through an index and accessing said one or more XML resources without using the index;
    wherein the method is performed by one or more computing devices;
    wherein XML files of said nodes are XML resources, and wherein the step of computing a computational cost comprises (a) computing a selectivity value for each of one or more predicates, from said request, that contain operators on said database repository and (b) computing a computational cost of traversing, to locate a particular XML resource specified in said request, an index in which said XML resources are indexed for accessing said database repository.

2. The method of claim 1,
    wherein the step of gathering statistics comprises gathering one or more data from a group consisting of:
        a total number of nodes, in said hierarchy, that are accessible via a path through a specified node,
        a total number of XML file containers, in said hierarchy, that are accessible via a path through said specified node,
        a total number of nodes, in said hierarchy, that are accessible via a path through said specified node and that are in a level of said hierarchy that is immediately under a level of said specified node,
        a total number of XML file containers, in said hierarchy, that are accessible via a path through said specified node and that are in a level of said hierarchy that is immediately under said level of said specified node, and
        a number of levels, from a root node of said hierarchy, at which said specified node is organized in said hierarchy.

3. The method of claim 1, wherein the step of storing statistics comprises storing said statistics in a relational table of a database of which said database repository is part.

4. The method of claim 3, wherein XML files of said nodes are XML resources, and wherein said relational table is a first relational table that is a different table than a second relational table in which said XML resources are stored in said database repository.

5. The method of claim 3, wherein said relational table is a relational table in which said XML resources are stored in said database repository.

6. The method of claim 1, wherein XML files of said nodes are XML resources, and wherein the step of storing statistics comprises storing said statistics in a hierarchical index table in which said XML resources are indexed for accessing said database repository.

7. A method comprising the computer-implemented steps of:
    gathering statistics by a database server about nodes that are stored in a database repository that is managed by the database server;
    wherein said nodes form a hierarchy;
    wherein each node is either an XML file or an XML file container;
    wherein at least one node in the hierarchy is an XML file container that contains a plurality of XML files, each of which contains a plurality of XML elements;
    storing said statistics; and
    in response to a single request to the database server for access to one or more XML resources from said database repository, before the database server executes said single request, the database server computing a computational cost associated with each of two or more methods of accessing said one or more XML resources from said database repository, based on said statistics;

wherein the method is performed by one or more computing devices;

wherein the step of computing a computational cost comprises computing a selectivity value for each of one or more predicates, from said request, that contain operators on said database repository; and wherein XML files of said nodes are XML resources, and wherein each of said XML resources is stored, in association with a location of a node in said hierarchy, in a column of a table in said database repository, and wherein an operator contained in at least one of said one or more predicates is an operator that determines whether a particular XML resource can be located in said database repository through a particular specified path, specified in said at least one predicate, through a portion of said hierarchy.

8. A method comprising the computer-implemented steps of:

gathering statistics by a database server about nodes that are stored in a database repository that is managed by the database server;

wherein said nodes form a hierarchy;

wherein each node is either an XML file or an XML file container;

wherein at least one node in the hierarchy is an XML file container that contains a plurality of XML files, each of which contains a plurality of XML elements;

storing said statistics; and in response to a single request to the database server for access to one or more XML resources from said database repository, before the database server executes said single request, the database server computing a computational cost associated with each of two or more methods of accessing said one or more XML resources from said database repository, based on said statistics;

wherein the method is performed by one or more computing devices;

wherein the step of computing a computational cost comprises computing a selectivity value for each of one or more predicates, from said request, that contain operators on said database repository; and wherein XML files of said nodes are XML resources, and wherein each of said XML resources is stored, in association with a location of a node in said hierarchy, in a column of a table in said database repository, and wherein an operator contained in at least one of said one or more predicates is an operator that determines whether a particular XML resource can be located in said database repository at a terminal location of a particular specified path, specified in said at least one predicate, through a portion of said hierarchy.

9. The method of claim 1, wherein computing said computational cost of traversing an index comprises computing a computational cost associated with one or more CPUs used for said traversing.

10. The method of claim 1, wherein computing said computational cost of traversing an index comprises computing a computational cost associated with reading data blocks in which portions of said index are stored.

11. The method of claim 1, wherein computing said computational cost of traversing an index comprises computing (a) a computational cost associated with one or more CPUs used for said traversing and (b) a computational cost associated with reading data blocks in which portions of said index are stored.

12. The method of claim 1, wherein said request for access to one or more XML resources from said database repository is a SQL query.

13. The method of claim 1, wherein said database repository is part of a relational database management system.

14. A computer-readable storage medium that stores instructions which, when executed by one or more processors, cause the one or more processors to perform the steps of:

gathering statistics by a database server about nodes that are stored in a database repository that is managed by the database server;

wherein said nodes form a hierarchy;

wherein each node is either an XML file or an XML file container;

wherein at least one node in the hierarchy is an XML file container that contains a plurality of XML files, each of which contains a plurality of XML elements;

storing said statistics; and in response to a request to the database server for access to one or more XML resources from said database repository, the database server computing a computational cost associated with each of two or more methods of accessing said one or more XML resources from said database repository, based on said statistics;

wherein the two or more methods of accessing said one or more XML resources from said database repository include accessing said one or more XML resources through an index and accessing said one or more XML resources without using the index;

wherein XML files of said nodes are XML resources, and wherein the step of computing a computational cost comprises (a) computing a selectivity value for each of one or more predicates, from said request, that contain operators on said database repository and (b) computing a computational cost of traversing, to locate a particular XML resource specified in said request, an index in which said XML resources are indexed for accessing said database repository.

15. The computer-readable storage medium of claim 14, wherein the step of gathering statistics comprises gathering one or more data from a group consisting of:

a total number of nodes, in said hierarchy, that are accessible via a path through a specified node, a total number of XML file containers, in said hierarchy, that are accessible via a path through said specified node, a total number of nodes, in said hierarchy, that are accessible via a path through said specified node and that are in a level of said hierarchy that is immediately under a level of said specified node, a total number of XML file containers, in said hierarchy, that are accessible via a path through said specified node and that are in a level of said hierarchy that is immediately under said level of said specified node, and a number of levels, from a root node of said hierarchy, at which said specified node is organized in said hierarchy.

16. The computer-readable storage medium of claim 14, wherein the step of storing statistics comprises storing said statistics in a relational table of a database of which said database repository is part.

17. The computer-readable storage medium of claim 16, wherein XML files of said nodes are XML resources, and wherein said relational table is a first relational table that is a different table than a second relational table in which said XML resources are stored in said database repository.

18. The computer-readable storage medium of claim 16, wherein said relational table is a relational table in which said XML resources are stored in said database repository.

19. The computer-readable storage medium of claim 14, wherein XML files of said nodes are XML resources, and wherein the step of storing statistics comprises storing said statistics in a hierarchical index table in which said XML resources are indexed for accessing said database repository.

20. A computer-readable storage medium that stores instructions which, when executed by one or more processors, cause the one or more processors to perform the steps of:
gathering statistics by a database server about nodes that are stored in a database repository that is managed by the database server;
wherein said nodes form a hierarchy;
wherein each node is either an XML file or an XML file container;
wherein at least one node in the hierarchy is an XML file container that contains a plurality of XML files, each of which contains a plurality of XML elements;
storing said statistics; and
in response to a single request to the database server for access to one or more XML resources from said database repository, before the database server executes said single request, the database server computing a computational cost associated with each of two or more methods of accessing said one or more XML resources from said database repository, based on said statistics;
wherein the step of computing a computational cost comprises computing a selectivity value for each of one or more predicates, from said request, that contain operators on said database repository; and
wherein XML files of said nodes are XML resources, and wherein each of said XML resources is stored, in association with a location of a node in said hierarchy, in a column of a table in said database repository, and wherein an operator contained in at least one of said one or more predicates is an operator that determines whether a particular XML resource can be located in said database repository through a particular specified path, specified in said at least one predicate, through a portion of said hierarchy.

21. A computer-readable storage medium that stores instructions which, when executed by one or more processors, cause the one or more processors to perform the steps of:
gathering statistics by a database server about nodes that are stored in a database repository that is managed by the database server;
wherein said nodes form a hierarchy;
wherein each node is either an XML file or an XML file container;
wherein at least one node in the hierarchy is an XML file container that contains a plurality of XML files, each of which contains a plurality of XML elements;
storing said statistics; and
in response to a single request to the database server for access to one or more XML resources from said database repository, before the database server executes said single request, the database server computing a computational cost associated with each of two or more methods of accessing said one or more XML resources from said database repository, based on said statistics;
wherein the step of computing a computational cost comprises computing a selectivity value for each of one or more predicates, from said request, that contain operators on said database repository; and
wherein XML files of said nodes are XML resources, and wherein each of said XML resources is stored, in association with a location of a node in said hierarchy, in a column of a table in said database repository, and wherein an operator contained in at least one of said one or more predicates is an operator that determines whether a particular XML resource can be located in said database repository at a terminal location of a particular specified path, specified in said at least one predicate, through a portion of said hierarchy.

22. The computer-readable storage medium of claim 14, wherein computing said computational cost of traversing an index comprises computing a computational cost associated with one or more CPUs used for said traversing.

23. The computer-readable storage medium of claim 14, wherein computing said computational cost of traversing an index comprises computing a computational cost associated with reading data blocks in which portions of said index are stored.

24. The computer-readable storage medium of claim 14, wherein computing said computational cost of traversing an index comprises computing (a) a computational cost associated with one or more CPUs used for said traversing and (b) a computational cost associated with reading data blocks in which portions of said index are stored.

25. The computer-readable storage medium of claim 14, wherein said request for access to one or more XML resources from said database repository is a SQL query.

26. A method comprising the computer-implemented steps of:
gathering, by a database management system, statistics about how many nodes that are stored in a repository of said database management system satisfy certain criteria;
wherein said nodes form a hierarchy;
wherein each node is either an XML file or an XML file container;
wherein at least one node in the hierarchy is an XML file container that contains a plurality of XML files, each of which contains a plurality of XML elements;
wherein XML files of said nodes are XML resources;
storing said statistics in said database management system;
the database management system using the statistics to determine how to process a query that accesses one or more XML resources;
wherein the method is performed by one or more computing devices; and
wherein the step of gathering statistics comprises gathering each of
a total number of nodes, in said hierarchy, that are accessible via a path through a specified node,
a total number of containers, in said hierarchy, that are accessible via a path through said specified node,
a total number of nodes, in said hierarchy, that are accessible via a path through said specified node and that are in a level of said hierarchy that is immediately under a level of said specified node, and
a total number of containers, in said hierarchy, that are accessible via a path through said specified node and that are in a level of said hierarchy that is immediately under said level of said specified node.

27. The method of claim 26, wherein the step of storing comprises storing said statistics as an XML data type in a schema-based table in said database management system.

28. A computer-readable storage medium that stores instructions which, when executed by one or more processors, cause the one or more processors to perform the steps of:

gathering, by a database management system, statistics about how many nodes that are stored in a repository of said database management system satisfy certain criteria;

wherein said nodes form a hierarchy;

wherein each node is either an XML file or an XML file container;

wherein at least one node in the hierarchy is an XML file container that contains a plurality of XML files, each of which contains a plurality of XML elements;

wherein XML files of said nodes are XML resources;

storing said statistics in said database management system;

the database management system using the statistics to determine how to process a query that accesses one or more XML resources;

wherein the step of gathering statistics comprises gathering each of a total number of nodes, in said hierarchy, that are accessible via a path through a specified node, a total number of containers, in said hierarchy, that are accessible via a path through said specified node, a total number of nodes, in said hierarchy, that are accessible via a path through said specified node and that are in a level of said hierarchy that is immediately under a level of said specified node, and a total number of containers, in said hierarchy, that are accessible via a path through said specified node and that are in a level of said hierarchy that is immediately under said level of said specified node.

29. A method comprising the computer-implemented steps of:

in response to a request for access to one or more XML resources from a database repository within a database management system, accessing, from said database management system, statistics about a structure of a hierarchy associated with said one or more XML resources;

wherein nodes form said hierarchy;

wherein each node of said hierarchy is either an XML file or an XML file container; and wherein at least one node in the hierarchy is an XML file container that contains a plurality of XML files, each of which contains a plurality of XML elements;

computing a computational cost associated with each of two or more methods of accessing said one or more XML resources from said database repository, based on said statistics;

wherein the two or more methods of accessing said one or more XML resources from said database repository include accessing said one or more XML resources through an index and accessing said one or more XML resources without using the index;

wherein the method is performed by one or more computing devices;

wherein XML files of said nodes are XML resources, and wherein the step of computing a computational cost comprises (a) computing a selectivity value for each of one or more predicates, from said request, that contain operators on said database repository and (b) computing a computational cost of traversing, to locate a particular XML resource specified in said request, an index in which said XML resources are indexed for accessing said database repository.

30. A computer-readable storage medium that stores instructions which, when executed by one or more processors, cause the one or more processors to perform the steps of:

in response to a request for access to one or more XML resources from a database repository within a database management system, accessing, from said database management system, statistics about a structure of a hierarchy associated with said one or more XML resources;

wherein nodes form said hierarchy;

wherein each node of said hierarchy is either an XML file or an XML file container; and wherein at least one node in the hierarchy is an XML file container that contains a plurality of XML files, each of which contains a plurality of XML elements;

computing a computational cost associated with each of two or more methods of accessing said one or more XML resources from said database repository, based on said statistics;

wherein the two or more methods of accessing said one or more XML resources from said database repository include accessing said one or more XML resources through an index and accessing said one or more XML resources without using the index;

wherein XML files of said nodes are XML resources, and wherein the step of computing a computational cost comprises (a) computing a selectivity value for each of one or more predicates, from said request, that contain operators on said database repository and (b) computing a computational cost of traversing, to locate a particular XML resource specified in said request, an index in which said XML resources are indexed for accessing said database repository.

31. A system comprising:

one or more hardware processors;

means, executing on the one or more hardware processors, for gathering statistics by a database server about nodes that are stored in a database repository that is managed by the database server;

means, executing on the one or more hardware processors, for storing said statistics; and means, executing on the one or more hardware processors, for computing, in response to a request to the database server for access to one or more XML resources from said database repository and based on said statistics, a computational cost, by the database server, associated with each of two or more methods of accessing said one or more XML resources from said database repository;

wherein the two or more methods of accessing said one or more XML resources from said database repository include accessing said one or more XML resources through an index and accessing said one or more XML resources without using the index;

wherein said nodes form a hierarchy;

wherein each node is either an XML file or an XML file container; and wherein at least one node in the hierarchy is an XML file container that contains a plurality of XML files, each of which contains a plurality of XML elements;

wherein XML files of said nodes are XML resources, and wherein said means for computing a computational cost comprises (a) means for computing a selectivity value for each of one or more predicates, from said request, that contain operators on said database repository and (b) means for computing a computational cost of traversing, to locate a particular XML resource specified in said request, an index in which said XML resources are indexed for accessing said database repository.

32. The method of claim 1
wherein the step of gathering statistics comprises gathering statistics about at least one of: (a) a median depth of a plurality of paths to a plurality of nodes in said hierarchy, and (b) a maximum depth of a plurality of paths to a plurality of nodes in said hierarchy; and
wherein the plurality of nodes are accessible via a path through a specified node.

33. The method of claim 1, wherein the request to the database server for access to one or more XML resources is through a view.

34. The method of claim 1, wherein the request includes one or more predicates and said one or more predicates includes at least one operator from the group of: UNDER_PATH, and EQUALS_PATH.

35. The method of claim 1,
wherein a particular predicate of said one or more predicates includes an UNDER_PATH operator;
wherein the particular predicate is associated with (a) a depth of infinity, and (b) a particular node; and
wherein computing a selectivity value for the particular predicate further comprises:
determining a first number of nodes, in said hierarchy, that are accessible via a path through the particular node,
determining a second number of nodes, in said hierarchy, that are accessible via a path through a root node of said hierarchy,
dividing the first number of nodes by the second number of nodes to produce a third number, and
multiplying the third number by 100 to produce the selectivity value.

36. The method of claim 1,
wherein a particular predicate of said one or more predicates includes an UNDER_PATH operator;
wherein the particular predicate is associated with (a) a depth of one, and (b) a particular node; and
wherein computing a selectivity value for the particular predicate further comprises:
determining a first number of nodes, in said hierarchy, that are accessible via a path through the particular node and that are in a level of said hierarchy that is immediately under a level of said particular node,
determining a second number of nodes, in said hierarchy, that are accessible via a path through a root node of said hierarchy,
dividing the first number of nodes by the second number of nodes to produce a third number, and
multiplying the third number by 100 to produce the selectivity value.

37. The method of claim 1,
wherein a particular predicate of said one or more predicates includes an EQUALS_PATH operator; and
wherein computing a selectivity value for the particular predicate further comprises:
determining a particular number of nodes, in said hierarchy, that are accessible via a path through a root node of said hierarchy,
taking the inverse of the particular number of nodes, and
multiplying the inverse of the particular number of nodes by 100 to produce the selectivity value.

38. The method of claim 10,
wherein a particular predicate, from said request, includes an UNDER_PATH operator;
wherein the particular predicate is associated with (a) a depth of infinity, and (b) a particular node; and
wherein computing said computational cost associated with reading data blocks in which portions of said index are stored further comprises:
determining a number of XML file containers, in said hierarchy, that are accessible via a path through the particular node to produce said computational cost associated with reading data blocks in which portions of said index are stored.

39. The method of claim 10,
wherein a particular predicate, from said request, includes an UNDER_PATH operator;
wherein the particular predicate is associated with (a) a depth of one, and (b) a particular node; and
wherein computing said computational cost associated with reading data blocks in which portions of said index are stored further comprises:
determining a number of XML file containers, in said hierarchy, that are accessible via a path through the particular node and that are in a level of said hierarchy that is immediately under said level of the particular node to produce said computational cost associated with reading data blocks in which portions of said index are stored.

40. A database system comprising:
one or more hardware processors;
an XML data repository comprising XML files and XML file containers forming a hierarchy;
wherein at least one XML file container contains a plurality of XML files, each of which contains a plurality of XML elements; and
a database server, executing on the one or more hardware processors, that manages the XML data repository, wherein the database server is configured to:
gather statistics about the XML files and the XML file containers,
store said statistics,
receive a request for access to one or more XML resources from the XML data repository, and
compute a computational cost associated with each of two or more methods of accessing said one or more XML resources from the XML data repository, based on said statistics;
wherein the two or more methods of accessing said one or more XML resources from said XML data repository include accessing said one or more XML resources through an index and accessing said one or more XML resources without using the index;
wherein said XML files are XML resources, and wherein computing a computational cost comprises (a) computing a selectivity value for each of one or more predicates, from said request, that contain operators on said XML data repository and (b) computing a computational cost of traversing, to locate a particular XML resource specified in said request, an index in which said XML resources are indexed for accessing said XML data repository.

41. A method comprising the computer-implemented steps of:
gathering statistics by a database server about XML files and XML file containers;
wherein the XML files and XML file containers are hierarchically stored in a database repository that is managed by the database server;
receiving a request to the database server for access, through a view, to one or more XML resources;
in response to receiving the request, computing a computational cost associated with each of two or more methods of accessing said one or more XML resources, comprising computing a selectivity value, based at least in part on the statistics, for a predicate included in the request; and determining a query plan based, at least in part, on the selectivity value;

wherein the method is performed by one or more computing devices;

wherein computing a computational cost associated with each of two or more methods of accessing said one or more XML resources further comprises computing a computational cost of traversing, to locate a particular XML resource specified in said request, an index in which said one or more XML resources are indexed for accessing said database repository;

wherein the two or more methods of accessing said one or more XML resources include accessing said one or more XML resources through an index and accessing said one or more XML resources without using the index.

42. The computer-readable storage medium of claim 14, wherein the request to the database server for access to one or more XML resources is through a view.

43. A computer-readable storage medium that stores instructions which, when executed by one or more processors, cause the one or more processors to perform the steps of:

gathering statistics by a database server about XML files and XML file containers;

wherein the XML files and XML file containers are hierarchically stored in a database repository that is managed by the database server;

receiving a request to the database server for access, through a view, to one or more XML resources;

in response to receiving the request, computing a computational cost associated with each of two or more methods of accessing said one or more XML resources, comprising computing a selectivity value, based at least in part on the statistics, for a predicate included in the request; and determining a query plan based, at least in part, on the selectivity value;

wherein computing a computational cost associated with each of two or more methods of accessing said one or more XML resources further comprises computing a computational cost of traversing, to locate a particular XML resource specified in said request, an index in which said one or more XML resources are indexed for accessing said database repository;

wherein the two or more methods of accessing said one or more XML resources include accessing said one or more XML resources through an index and accessing said one or more XML resources without using the index.

\* \* \* \* \*

UNITED STATES PATENT AND TRADEMARK OFFICE
CERTIFICATE OF CORRECTION

PATENT NO. : 7,930,277 B2
APPLICATION NO. : 10/830211
DATED : April 19, 2011
INVENTOR(S) : Ge et al.

It is certified that error appears in the above-identified patent and that said Letters Patent is hereby corrected as shown below:

On Title page 4, Item (56) under "Other Publications", line 2, delete "Scottland," and insert -- Scotland, --, therefor.

Signed and Sealed this
Fourth Day of October, 2011

David J. Kappos
*Director of the United States Patent and Trademark Office*